United States Patent [19]

Stockton et al.

[11] Patent Number: 4,608,032

[45] Date of Patent: Aug. 26, 1986

[54] INFINITELY VARIABLE BELT DRIVE WITH LOW FRICTION SEALS FOR THE PRIMARY AND SECONDARY SHEAVES

[75] Inventors: Thomas R. Stockton, Ann Arbor; Frederick J. Morris, Milford, both of Mich.

[73] Assignee: Ford Motor Company, Dearborn, Mich.

[21] Appl. No.: 667,657

[22] Filed: Nov. 2, 1984

[51] Int. Cl.[4] ............................................. F16H 11/04
[52] U.S. Cl. ........................................ 474/28; 74/689;
        92/108
[58] Field of Search ........................ 474/11, 12, 17, 18,
        474/28; 74/689, 665 GE; 403/50, 51; 92/93, 98
        D, 107, 108

[56] References Cited

U.S. PATENT DOCUMENTS

| | | | |
|---|---|---|---|
| 2,731,534 | 1/1956 | Hansen et al. | 92/93 |
| 3,244,013 | 4/1966 | Deschner | 403/50 |
| 3,600,960 | 8/1971 | Karig et al. | 474/28 |
| 4,274,520 | 6/1981 | Vander Hardtaberson | 192/3.32 |
| 4,304,150 | 12/1981 | Lupa et al. | 74/677 |
| 4,455,888 | 6/1984 | Wayman et al. | 74/689 |

FOREIGN PATENT DOCUMENTS 0207561  12/1983  Japan ........................................ 474/28

OTHER PUBLICATIONS

Bellofram Catalog (Rolling Diaphragms), 3/63, p. 6, FIG. 19, Mar. 1963.

Primary Examiner—Lawrence Staab
Assistant Examiner—Martin G. Belisario
Attorney, Agent, or Firm—Donald J. Harrington; Keith L. Zerschling

[57] ABSTRACT

An infinitely variable power transmission mechanism comprising a driving sheave assembly and a driven sheave with a torque transmitting drive belt connecting the sheaves, a ratio controlling servo for changing the effective pitch diameter of the sheave assemblies, a belt loading servo for controlling the load capacity of the belt and relatively reduced friction diaphragm actuators for adjustably positioning movable sheave portions of the sheave assemblies, the belt and sheave assembly portions of the mechanism being in a housing area that is isolated from gearing portions of the mechanism.

2 Claims, 4 Drawing Figures

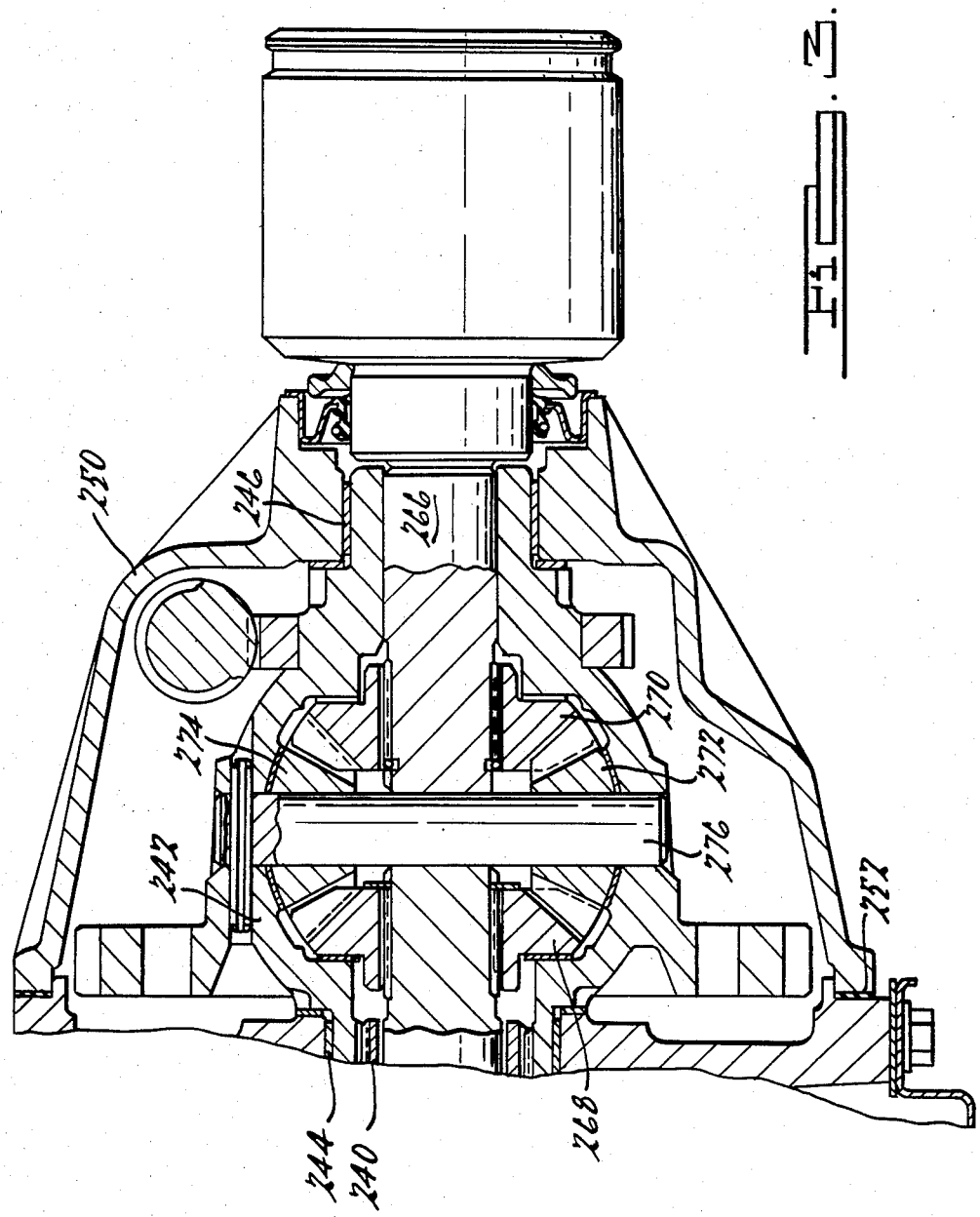

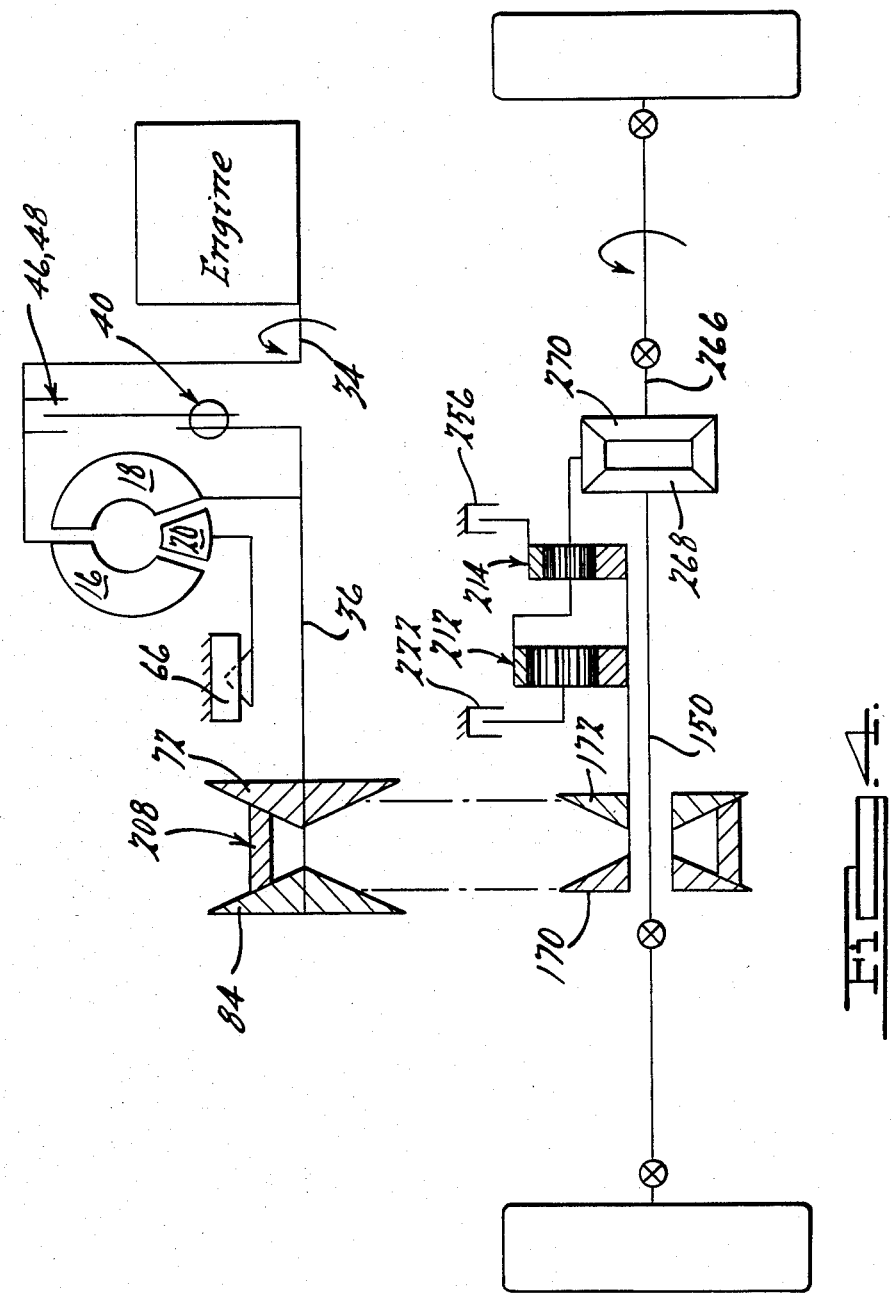

INFINITELY VARIABLE BELT DRIVE WITH LOW FRICTION SEALS FOR THE PRIMARY AND SECONDARY SHEAVES

DISCUSSION OF THE PRIOR ART AND GENERAL DESCRIPTION OF THE INVENTION

Our invention relates to an infinitely variable belt type transaxle adaptable for use in a front wheel drive vehicle. It includes a hydrokinetic torque converter arranged in series relationship with respect to a variable ratio belt and sheave assembly. Ratio changes are accomplished by hydraulically loading the sheaves to change the effective pitch diameter of the sheaves. The torque converter is used to extend the drive ratio range available during acceleration from a standing start. As the vehicle speed increases and the torque converter coupling point is approached, the torque converter is locked up by a lockup clutch located within the torque converter impeller shell.

A forward-and-reverse gear arrangement is provided on the output shaft axis. It is connected to the output shaft itself by a concentrically disposed differential mechanism.

Provision is made for isolating the transmission lubrication system from the hydraulic pressure system required for the sheaves. This avoids contamination of the hydraulic fluid for the belt drive and permits belt replacement without the necessity for complete transmission disassembly.

I am aware of prior art designs that employ a fluid coupling or hydrokinetic torque converter in series relationship with respect to a belt drive. Examples of such arrangements can be seen in U.S. Pat. Nos. 4,455,888 and 4,274,520, the former showing a hydrokinetic torque converter and the latter showing a fluid coupling in series relationship with respect to a belt drive. U.S. Pat. No. '520 also shows a lockup clutch for the fluid coupling which establishes a direct drive between the engine and the torque input or primary sheave for the belt drive.

Pat. No. 4,304,150 also shows a hydrokinetic torque converter in series relationship with respect to the infinitely variable sheave assembly. In addition it describes a hydrokinetic torque flow path between the engine and the driven portion of the transmission system which bypasses the infinitely variable belt drive so that maximum hydrokinetic driving torque can be distributed directly to the driving axles during start up of the vehicle from a standing start. A separate clutch is used to establish a direct connection between the engine and the input sheave when the acceleration mode is completed.

In each of the prior art transmissions illustrated in these prior art references the sheaves are adjusted by hydraulic servos, each servo including an annular piston and cylinder assembly that is effective to adjust axially a movable sheave disc for the respective sheave assembly. This introduces sliding friction as the sheave portions are adjusted, one with respect to the other, to effect a change in the operating pitch diameter of the sheaves.

According to a feature of our invention we have provided sheave assemblies that do not require sliding friction seals to isolate the sheave actuating pressure.

In addition to the reduced friction and the simplified hydraulic control scheme that results from the use of a relatively frictionless seal for the hydraulic actuators for the sheaves, the improvements of our invention make it possible to isolate the transmission fluid for the gearing portions of the mechanism from the belt drive portions of the mechanism. The belt drive mechanism, for purposes of assembly and disassembly, is contained in a housing portion that is bolted to a common housing for the hydrokinetic torque converter and transmission gearing.

BRIEF DESCRIPTION OF THE FIGURES OF THE DRAWINGS

FIG. 3 is a cross-sectional view of the output differential gearing. FIGS. 1, 2 and 3 are parts of the same cross-sectional representation of the transmission mechanism of our invention but they have been separated for purposes of clarity.

FIG. 4 is a schematic representation of the transmission of FIGS. 1, 2 and 3.

PARTICULAR DESCRIPTION OF THE INVENTION

Figure 1:
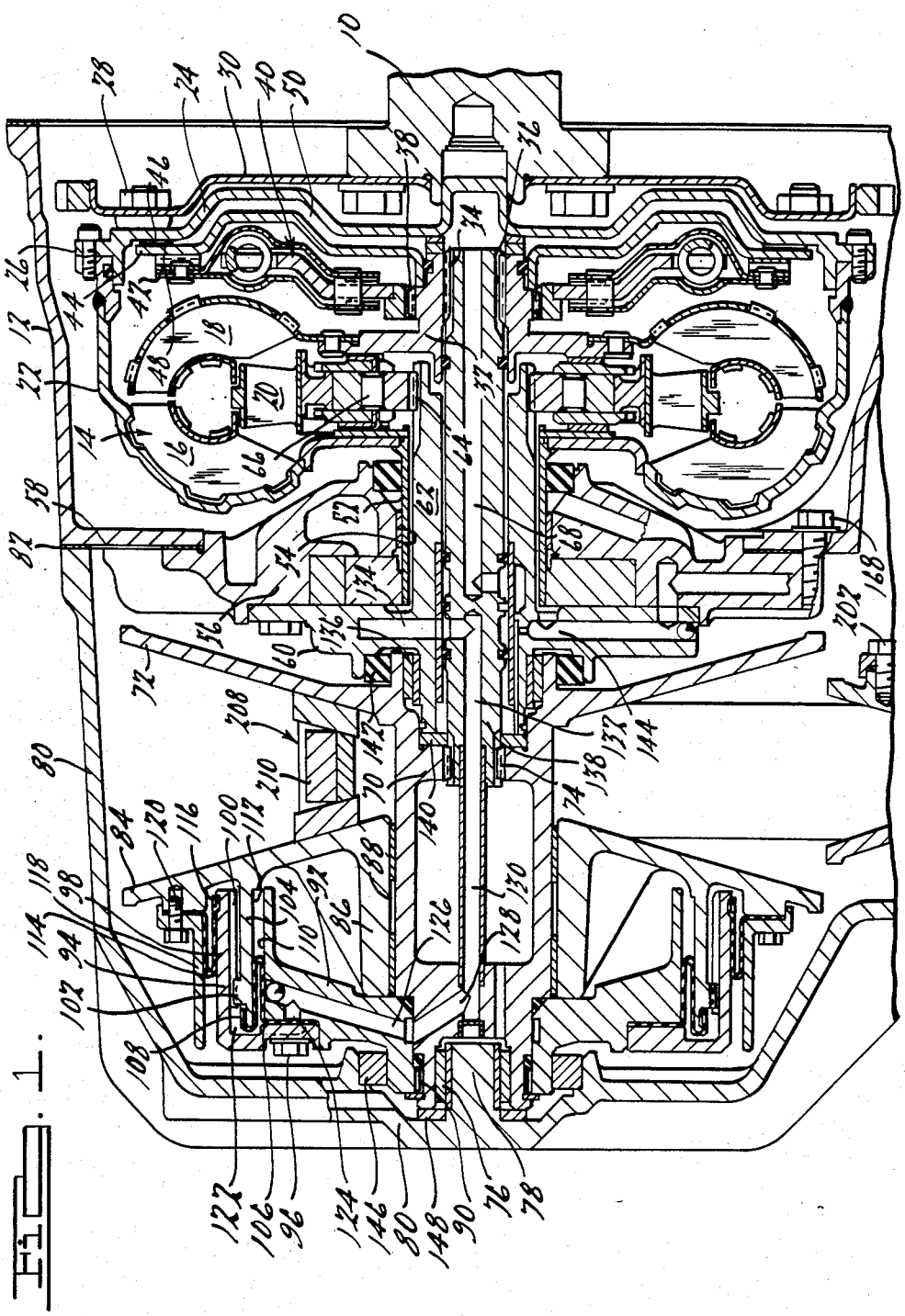
FIG. 1 shows a longitudinal, cross-sectional view of the belt drive portion and the hydrokinetic torque converter of our transmission mechanism.

In FIG. 1 numeral 10 designates the end of the crankshaft for an internal combustion engine for a wheeled vehicle. The engine has an engine block to which one end of a first housing portion 12 is bolted. Located within the housing portion 12 is a hydrokinetic torque converter 14 which includes a bladed impeller 16, a bladed turbine 18 and a bladed stator 20. The impeller 16 includes an impeller housing 22 which encloses turbine 18 and stator 20. The impeller housing is a closed housing defined in part by end wall 24 secured at its margin 26 to a peripheral shoulder for the housing 22.

The radially outward part of the wall 24 is secured at 28 to drive plate 30 which is secured at its hub to the end of crankshaft 10.

Turbine 18 includes a turbine hub 32 which is splined at 34 to turbine shaft 36. It is splined also at 38 to the hub of a damper assembly 40, which is connected drivably at its radially outward periphery 42 to clutch plate 44. The radially outward margin of clutch plate 44 is provided with clutch friction material 46 which frictionally engages clutch surface 48 formed on the radially outward portion of housing plate 24. The left hand side of the clutch plate 44 is subjected to the static pressure of the hydrokinetic fluid in the torus circuit of the hydrokinetic torque converter 14. The force developed by that pressure tends to engage the friction surfaces of the clutch plate 44 and the companion friction surface of the housing plate 24 thus tending to lock the turbine to the impeller.

When the space 50 located between clutch plate 44 and the inner surface of the housing plate 24 is pressurized, the frictional connection established by the frictional contact of clutch plate 44 with the housing plate 24 is interrupted and fluid flow occurs in a radial outward direction across the friction surfaces and to the interior of the torus circuit region. This disconnects the turbine from the impeller, and the turbine acts as a free converter in the usual fashion.

Impeller housing 22 is supported by impeller sleeve shaft 52 journalled in bearing opening 54 in a positive displacement pump housing 56. The housing 56 forms a wall on the left hand side of the housing portion 12. It is secured to flange 58 on the housing portion 12. End plate 60 secured to the pump housing 56 includes a stator sleeve shaft 62 which is splined at 64 to the inner race of an overrunning coupling for the stator 20. Stator 20 thus is held against rotation in the direction opposite to the direction of movement of the impeller, but it permits freewheeling motion during operation of the converter in the coupling mode.

Fluid pressure for releasing the lockup clutch for the converter is supplied to the space 50 through pressure supply passage 68 formed in the turbine shaft 36. Shaft 36 is splined at its left hand end to the hub 70 of input sheave portion 72, the spline connection being shown at 74. The turbine shaft 36 thus rotates with the sheave portion 72.

The left hand side of the sheave portion 72 is journalled by bearing 76 on bearing support 78 which forms a part of transmission housing portion 80. The sheave assembly of which the sheave portion 72 forms a part is closed by housing portion 80, the latter being bolted or otherwise secured at its margin 82 to the left hand side of the housing portion 12.

Another portion of the input sheave assembly is shown at 84. It is slidably positioned on the hub 70 for the sheave portion 72. The hub portion for the sheave portion 84 is shown at 86 and a bearing 88 is provided between the hub portions 86 and 70 to permit relatively friction-free axial movement of sheave portion 84 relative to sheave portion 72.

The hub 70 is splined at 90 to a sheave actuator housing 92. A sheave drive member 94 is secured by bolts 96 to the housing 92. It is provided with a drum-shaped, axially extending part 98 which has internal splines 100. These splines engage drivably external spline teeth 102 formed on an axial extension 104 of the sheave portion 84.

The inner margin of a flexible diaphragm seal 106 is secured between the cooperating faces of the housing 92 and the drive member 98. The outer margin of the seal 106 is secured at 108 to the left hand margin of the extension 104 and is held in place by a clamp ring, as shown. The intermediate part of the seal 106 forms a flexible diaphragm that is engaged with the external peripheral surface 110 of the housing 92 and the internal peripheral surface 112 of the extension 104. Upon relative movement of the sheave portion 84 relative to the housing 92, the diaphragm seal 106 rolls on the annular surfaces 110 and 112.

A second flexible diaphragm seal is provided at 114. The inner periphery of the diaphragm seal 114 is secured to the right hand end of the drive part 98 as shown at 116. A clamp ring is provided, as shown. The outer margin of the flexible diaphragm seal 114 is secured between the cooperating surfaces of sheave portion 84 and an annular axially extending seal retainer 118. Retainer 118 is secured to the sheave portion 84 by clamping bolts 120.

The space 122 on the left hand side of the flexible diaphragm seal 106 communicates through feed passage 124 with pressure fluid feed passage 126 formed in the housing 92. Passage 126 in turn communicates with radially extending passage 128, which communicates with pressure fluid delivery passage 130 extending along the axis of the sheave portion 72. Passage 130 is defined by a flow delivery tube extending from a central opening in the left hand side of the hub 70 to a central passage 132 in turbine shaft 36. The right hand end of passage 132 communicates with control pressure supply passage 134 in the pump cover plate 60.

Sheave portion 72 is journalled by bearing 136 on stationary sleeve shaft extension 138 for the pump cover 60. Thrust washer 140 accommodates axial thrust forces acting on the sheave portion 72 and running seal 142 isolates the lubricating fluid supplied to the bearings 136 and 140 from the lubrication oil supply passage 144. A rotary oil seal 146 is located at the left hand side of the sheave hub 70 for isolating lubricating oil supplied to bearing 76 and to thrust bearing 148.

Figure 2:
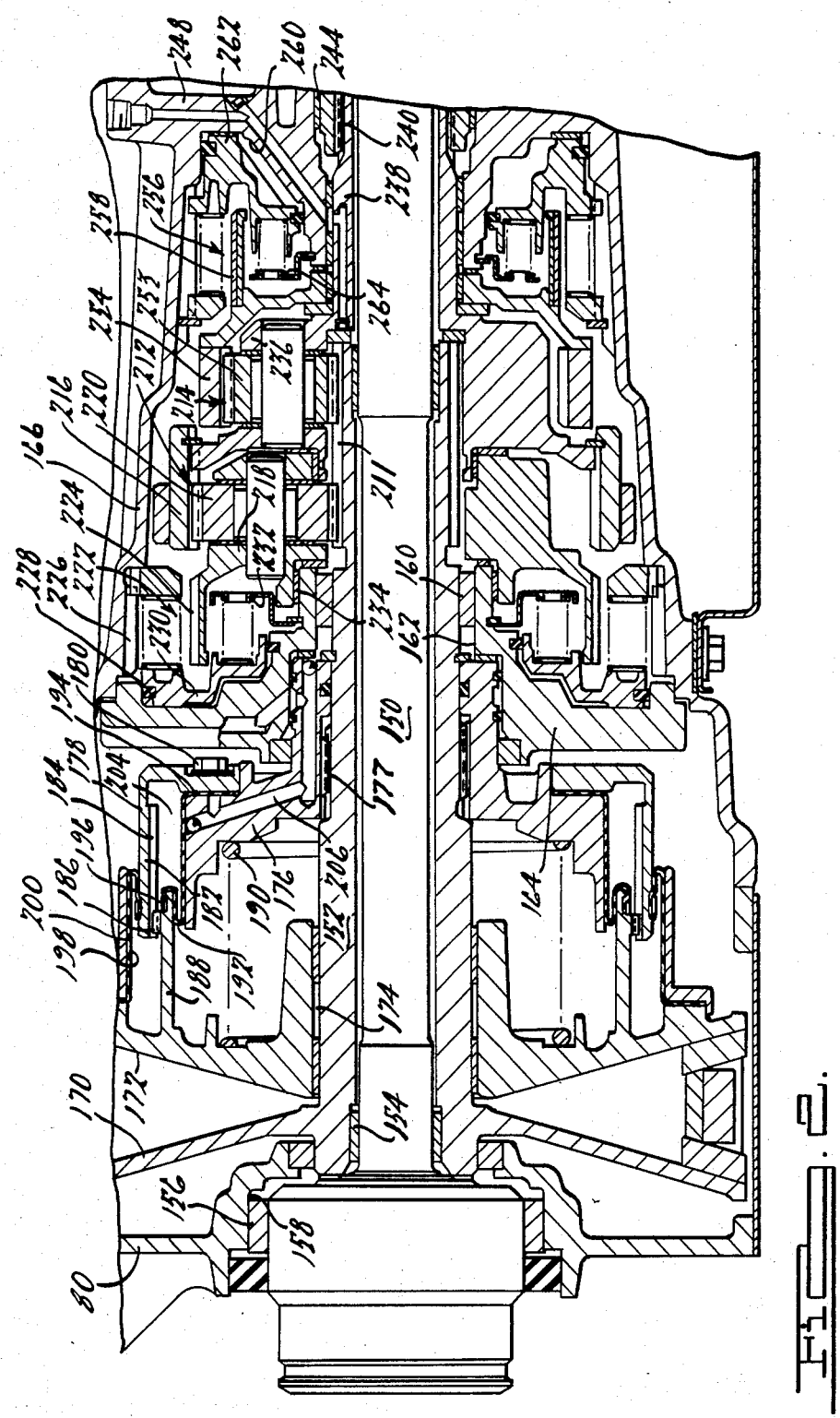
FIG. 2 is a cross-sectional view of the planetary portions of the transmission mechanism of our invention.

As seen in FIG. 2, a first output shaft 150 is mounted in the lower portion of the transmission assembly in parallel relationship with respect to the axis of the converter and the input sheave assembly. An output sheave sleeve shaft 152 surrounds output shaft 150. The left hand end of the sleeve shaft 152 is journalled by bearing 154 on the shaft 150. The left hand end of the shaft 150 is journalled at 156 in a bearing recess 158 formed in the wall of housing 80. Shaft 152 is journalled also by bearing 160 received in bearing opening 162 formed in support wall 164. This wall is secured at its periphery to the interior of the transmission housing 166. Housing 166 in turn is secured by bolts 168 to the housing 80, as seen in FIG. 1. The housing 166 forms a part of converter housing 12. Preferably housing 12 and housing 166 are formed as a single casting.

Output sheave sleeve shaft 152 is formed integrally with output sheave portion 170. A companion output sheave portion 172 is slidably supported by bearing 174 on the shaft 152. A pressure actuator portion 176 is splined at 177 to the shaft 152 and extends radially outwardly. An actuator portion 178 is secured by bolts 180 to the actuator portion 176, and it is provided with an axial extension 182. Internal spline teeth 184 are formed on the extension 178. These teeth mesh with external spline teeth 186 formed on extension 188 of the output sheave portion 172. A clamping force spring 190 is disposed between the sheave portion 172 and the actuator portion 176 to establish a threshold clamping load on the output sheave assembly.

A flexible diaphragm seal 192 is secured at its inner margin to an annular shoulder 194 on the actuator portion 176. The inner margin 194 of the flexible diaphragm seal 192 is clamped between the mating surfaces of the actuator portion 176 and the drive portion 178. The radially outward margin of the flexible diaphragm seal 192 is secured to the right hand end of extension 188 and is held in place preferably by a clamping ring 196.

The left end of the axially extending portion 182 of the drive portion 178 has secured thereto the inner margin of a second flexible diaphragm seal for the output sheave assembly as shown at 198. The outer margin of the diaphragm seal 198 is secured to the cooperating surfaces of sheave extension 200, which is bolted to the sheave portion 172 at a radially outward location by means of clamping bolts 202. The intermediate portion of the diaphragm seal 198 rides over the outer annular surface of axially extending portion 182 of the drive member 178 and the inner annular surface of extension 200. A pressure chamber 204 on the right hand side of diaphragm seal 192 and the left hand side of diaphragm seal 198 communicates with pressure feed passage 206.

The input sheave assembly is connected drivably to the output sheave assembly by a drive belt 208. Belt 208, in the disclosed working embodiment of the invention, is a rubber belt having reinforced steel segments 210. It is formed with conical shaped sides that register with the cone surfaces of the input sheave assembly portions 72 and 84 as well as the cone surfaces of the output sheave assembly portions 170 and 172. As sheave portion 84 is adjusted relative to the sheave portion 72, belt 208 increasing its effective pitch radius with respect to the input sheave assembly and this is accompanied by a corresponding decrease in the operating pitch radius of the output sheave assembly. Sheave portion 172 slides on sleeve shaft 152 in a right hand direction. When the speed ratio of the sheave drive increases in FIGS. 1 and 2 the sheave assemblies are shown in the maximum underdrive condition.

Torque transmitted from the input sheave assembly to the output sheave assembly is distributed through the shaft 152 to a sun gear 211, which is common to reverse planetary gear assembly 212 and the forward drive planetary gear assembly 214.

Planetary gear unit 212 includes a ring gear 216, a carrier 218 and planet pinions 220 journalled on the carrier 218. Carrier 220 is adapted to be braked by a friction brake assembly 222, which comprises internally splined brake discs carried by spline portion 224 of the carrier 218 and externally splined discs carried by the internally splined portion 226 of the housing 166. Bearing support wall 164 is provided with an annular cylinder 228 which receives annular piston 230, the latter engaging brake discs for the brake assembly 222 as fluid pressure is admitted to the annular cylinder 228. Piston return spring 232 disengages the brake discs of the brake assembly 222 when fluid pressure is exhausted from cylinder 228.

Carrier 218 is journalled by bushing 234 on the bearing support wall 164. Ring gear 216 is connected to carrier 236 for planetary gear unit 214. Carrier 236 forms a part of, or is connected to, output shaft 238, which is splined at 240 to differential carrier 242 as seen in FIG. 3. Carrier 242 is straddle mounted by bearings 244 and 246 in bearing openings formed in end wall 248 for housing 166 and in differential housing 250, the latter being secured by bolts at its margin 252 to the end wall 248.

Carrier 236 journals planetary pinions 253 which engage sun gear 211. Pinions 220 also engage sun gear 211.

Ring gear 254 is journalled on output shaft 238 and is adapted to be braked by multiple disc friction brake 256. Brake 256 includes internally splined brake discs carried by ring gear extension 258 and externally splined brake discs carried by housing 166. Housing 166 and end wall 248 define a cylinder 260 in which is positioned brake actuator piston 262. Piston return spring 264 acts on the piston 262 to disengage the brake 256 when fluid pressure is exhausted from the cylinder 260.

A second output shaft 266, as seen in FIG. 3, extends to one axle shaft and is aligned with the companion axle shaft 150. Shaft 150 is connected to differential side gear 268. Output shaft 266 is connected to differential side gear 270, as seen in FIG. 3, and both differential side gears engage differential pinions 272 and 274 which are journalled by cross pin 276 in the differential carrier 242.

During operation of the transmission mechanism the infinitely variable sheave drive, during acceleration, operates in its maximum underdrive ratio and continues to develop torque which is distributed to the output shaft and to the planetary transmission until the converter coupling point is reached. At that time the lock up clutch is applied. A variation in ratio occurs as sheave portion 84 is adjusted relative to sheave portion 72 by admitting fluid pressure to the working chamber 122. Similarly, sheave portion 172 of the output sheave assembly is adjusted relative to the sheave portion 170 as the input sheave assembly is adjusted. The clamping pressure is controlled by controlling the pressure in the working chamber 204.

With this design the drive spline 102 for the input sheave assembly and the drive spline 186 for the output sheave assembly are located inside their respective sheave piston apply pressure cavities so that these drive splines are constantly lubricated thus permitting relatively friction free adjustments of the sheave portion 72 relative to sheave portion 84 and sheave portion 172 relative to sheave portion 170. In addition, the flexible diaphragm seals assure a dry environment for the belt. These features are in contrast to sliding servo actuators of the kind shown in the prior art patents discussed in the introductory portions of this specification.

The infinitely variable torque range is available for either forward or reverse drive. Reverse drive is obtained by engaging reverse brake 222 and releasing forward brake 256. Forward drive is achieved by engaging brake 256 and releasing brake 222.

In addition to the foregoing features the transmission mechanism includes a planetary gear system that is isolated with respect to the flexible belt drive portion. This avoids contamination of the belt environment with transmission lubricating oil and it also permits belt replacement without complete disassembly of the transmission mechanism. Belt replacement can occur merely by disassembling the housing portion 80 and removing the belt drive components on the input sheave assembly end of the belt drive without removing the output sheave assembly or the bearing support wall 164 for the planetary gearing.

Having thus described a preferred embodiment of our invention, what we claim and desire to secure by U.S. Letters Patents is:

1. An infinitely variable belt drive comprising:
   a torque input sheave assembly, a torque output sheave assembly and a belt driveably connecting said sheave assemblies;
   said driving sheave assembly comprising an axially fixed driving sheave portion and an axially adjustable driving sheave portion with said belt positioned between said driving sheave portions and frictionally engageable therewith, the pitch radius of said belt and driving sheave assembly increasing as said adjustable driving sheave portion is moved axially relative to said fixed driving sheave portion;
   a fluid pressure actuator for said driving sheave assembly comprising an actuator member located adjacent said axially adjustable driving sheave portion and connected to said fixed driving sheave portion, said actuator member having an axial extension, a fist axial extension carried by said adjustable driving sheave portion located adjacent the axial extension of said actuator member and a second axial extension carried by said fixed driving sheave portion;
   a first flexible diaphragm seal connected at its outer margin to said adjustable driving sheave portion and at its inner margin to said second axial extension;
   a second flexible diaphragm seal secured at its inner margin to said fixed actuator member and at its outer margin to said first axial extension;

said actuator member and said diaphragm seals defining a pressure chamber which, when pressurized, causes said adjustable driving sheave portion to move axially relative to said fixed driving sheave portion, the adjustable driving sheave portion and the fixed driving sheave portion being formed with engaging sliding spline teeth, said sliding spline teeth being located within the pressure chamber for said driving sheave assembly.

2. The combination as set forth in claim 1 wherein said torque output sheave assembly comprises an axially fixed output sheave portion and an axially adjustable output sheave portion, a fluid pressure actuator for said driven sheave assembly comprising an output actuator member located adjacent said axially adjustable output sheave portion and connected to said fixed output sheave portion, said output actuator member for said output sheave assembly having first axial extensions, a second axial extension carried by said adjustable output sheave portion;

a third flexible diaphragm seal connected at its outer margin to said adjustable output sheave portion and at its inner margin to the first extension of said ouput actuator member;

a fourth flexible diaphragm seal secured at its inner margin to said output actuator member and at its outer margin to said second axial extension of said adjustable output sheave portion;

said output actuator member and said third and fourth diaphragm seals defining a pressure chamber which, when pressurized, causes said adjustable output sheave portion to move axially relative to said fixed output sheave portion;

the adjustable driving sheave portion and the fixed driving sheave portion being formed with engaging sliding spline teeth and the adjustable output sheave portion and the fixed output sheave portion being formed with engaging sliding spline teeth, the sliding spline teeth for the driving sheave assembly and for the output sheave assembly both being located within their respective pressure chambers.

* * * * *